United States Patent [19]
Swearingen et al.

[11] 3,770,570
[45] Nov. 6, 1973

[54] CABLE SHIELDING TAPE

[75] Inventors: Charles C. Swearingen, Bay Village; Nicolas Sheptak, Rocky River, both of Ohio

[73] Assignee: The Dow Chemical Company, Midland, Mich.

[22] Filed: Apr. 23, 1970

[21] Appl. No.: 31,386

Related U.S. Application Data

[63] Continuation-in-part of Ser. No. 734,392, June 4, 1968, abandoned.

[52] U.S. Cl. .............. 161/216, 161/146, 161/147, 161/148, 156/290, 117/45, 117/75, 117/122 H

[51] Int. Cl. ........................... E06b 3/12, E06b 9/00

[58] Field of Search ................. 161/146, 147, 148, 161/216; 156/290; 117/45, 75, 122 H

[56] References Cited
UNITED STATES PATENTS

| | | | |
|---|---|---|---|
| 3,464,842 | 9/1969 | Jackstadt | 117/45 |
| 3,259,507 | 7/1966 | Smith | 117/122 H |
| 3,138,897 | 6/1964 | McCorkle | 117/45 |
| 3,402,086 | 9/1968 | Smith et al. | 156/244 |
| R26,473 | 10/1968 | Reynolds et al. | 161/148 |
| 3,392,076 | 7/1968 | Van Gilse et al. | 156/244 |
| 3,325,589 | 6/1967 | Mildner | 174/107 |
| 2,539,420 | 1/1951 | Hazeltine et al. | 161/146 |

Primary Examiner—Alfred L. Leavitt
Assistant Examiner—M. F. Esposito
Attorney—Griswold and Burdick, Richard G. Waterman, Lester J. Dankert and Ralph M. Mellom

[57] ABSTRACT

A cable shielding tape comprising a metallic strip such as aluminum and a tightly adhering layer of an adhesive copolymer of an α-olefin such as ethylene and an α,β-ethylenically unsaturated carboxylic acid such as acrylic acid is provided with zones of reduced adhesion between the metallic strip and the copolymer layer by means of a latent adhesive such as poly(vinyl acetate) or by means of a fugitive release agent such as oleic acid disposed in prescribed areas between the adhesive copolymer layer and the metallic strip. The latent adhesive material has delayed tack properties such that its adhesion to the metallic strip can be increased by the application of heat. The fugitive release agent is of a type which will become absorbed by the adhesive copolymer such that the adhesion of the adhesive copolymer to the metallic strip can be increased by the application of heat.

7 Claims, 3 Drawing Figures

3,770,570

INVENTORS.
Charles C. Swearingen
BY Nicholas Sheptak

Ralph M. Mellom
ATTORNEY

CABLE SHIELDING TAPE

This application is a continuation-in-part of application Ser. No. 734,392 filed June 4, 1968 now abandoned.

This invention relates to cable shielding tapes. In one aspect, this invention relates to cable shielding tapes of metal having corrosion protective coverings on one or both sides thereof. In another aspect, this invention relates to cable shielding tapes of a metal layer and an adhesive polymer layer bonded together and having at least one zone of reduced adhesion.

The concept of using a metallic shield in cable construction to envelop one or more conductors or groups of conductors has prompted the development and use of a metallic shield having one or both of its surfaces coated with a tightly adhering layer of a polymer material. This tightly adhering polymer layer improves the over-all structural properties of the cable in that longitudinal stresses and strains are transmitted across the width of the cable such that all members of the cable share the load. The tightly adhering layer of polymer material also provides important protection against corrosive atmospheres and liquids in the event the metallic shield becomes exposed to a corrosive environment.

While the one and two side coated metallic shields for cable construction described above represent a substantial advancement in the art of cable design, one problem associated with their use occurs when it is necessary to remove a portion of the tightly adhered polymer layer. For example, in splicing or otherwise joining two lengths of cable having a metallic shield coated with a layer of a tightly adhering polymer material it is often necessary to form a conductive path across the joint and between the metallic shields. Since the polymer material is electrically insulative, in certain types of joints this necessitates the removal of a portion of the tightly adhering polymer layer from the metallic shield. Since the layer of polymer material is bonded to the metallic shield for the purpose of guarding against corrosion and for the purpose of improving the structural properties of the cable it is very difficult and time consuming to remove a portion of the polymer material in order to make a conductive joint. Moreover, since the exact position of a splice or joint cannot be ascertained during fabrication of the coated metallic shield, one cannot solve the problem by using a metallic shield having areas without protective layers of a tightly adhering polymer material since this would defeat the purpose of the protective layer.

According to this invention, a metallic cable shield having a protective layer of an adhesive polymer material is fabricated such that the protective layer can be easily removed in certain desired areas to expose the metallic shield without materially affecting the protective nature of the polymer layer. This is accomplished by a cable shielding tape construction comprising a metallic strip, a layer of an adhesive copolymer of an $\alpha$-olefin and an $\alpha$, $\beta$-ethylenically unsaturated carboxylic acid in mating relationship with at least one surface of the metallic strip, and a layer of a latent adhesive or a fugitive release agent disposed between the metallic strip and the layer of the adhesive copolymer which, respectively, defines at least one zone of reduced adhesion wherein the adhesive copolymer is prevented from adhering to the metallic strip or which defines at least one zone of reduced adhesion between the layer of adhesive copolymer and the metallic strip.

The latent adhesive is fashioned of a material having delayed tack properties which allow its adhesion to the metallic strip to be increased by the application of heat. Thus, in that embodiment of the invention which includes the layer of latent adhesive which prevents the adhesive copolymer from adhering to the metallic strip in a zone commensurate with the area of the latent adhesive, the adhesion between the metallic strip and the latent adhesive can be increased by the application of heat or by the application of heat and pressure after, for example, two lengths of cable shielding tape have been spliced together and a conductive joint made between the two lengths of tape.

The fugitive release agent is of a type which prevents the adhesive copolymer from tightly adhering to the metallic strip initially, relative to the adhesion between the metallic strip and the adhesive copolymer in a zone without any fugitive release agent, but which after becoming absorbed by the adhesive copolymer allows the adhesion of the layer of adhesive copolymer to the metallic strip to be increased by the application of heat or by the application of heat and pressure. Thus, in that embodiment of the invention which includes a fugitive release agent disposed between the metallic strip and the layer of the adhesive copolymer to provide a zone of reduced adhesion commensurate with the area occupied by the fugitive release agent, the adhesion of the adhesive copolymer can be increased after, for example, two lengths of cable shielding tape have been spliced together and a conductive joint made between the tapes.

In another embodiment of the invention, the cable shielding tape having the latent adhesive or fugitive release agent disposed between the layer of the adhesive copolymer and the metallic strip is provided with a second layer of the adhesive copolymer adhered to the metallic strip on the surface thereof opposite to the surface in contact with the latent adhesive or the fugitive release agent. In a modification of this embodiment of the invention, the cable shielding tape is provided with a fugitive release agent or a layer of a latent adhesive between the metallic strip and the second layer of the adhesive copolymer such that the cable shielding tape has a zone of reduced adhesion between each adhesive copolymer layer and the metallic strip.

As indicated above, the zone of reduced adhesion in the cable shielding tape of this invention is formed with a material characterized by having a latent adhesiveness or with a material characterized by having an affinity to the copolymer layer. Both the latent adhesive and the fugitive release agent serve to define one or more zones which allow the adhesive copolymer to be stripped from the metallic strip. The latent adhesive and fugitive release agent can exist throughout the total area between the metallic strip and the adhesive copolymer layer or they can extend over only a portion of the area between the metallic strip and the layer of the adhesive copolymer. In that embodiment wherein the latent adhesive and fugitive release agent extend over only a portion of the area between the metallic strip and the layer of the adhesive copolymer, the adhesive copolymer layer is tightly bonded to the metallic strip in the remainder of the area between the metallic strip and the adhesive copolymer layer.

The latent adhesive and the fugitive release agent can each exist in the form of a single strip longitudinal or transverse of the cable shielding tape or each can exist in the form of a plurality of separate strips transversely spaced and substantially longitudinal of the cable shielding tape. In the latter embodiment, the strips of latent adhesive provide a plurality of separate zones wherein the adhesive copolymer is prevented from adhering to the metallic strip. Similarly, in the embodiment wherein the fugitive release agent exists in the form of a plurality of separate strips, a plurality of separate zones of reduced adhesion between the layer of the adhesive copolymer and the metallic strip will result. In still another embodiment of the invention, the latent adhesive and fugitive release agent can each be in the form of at least one generally circular, discshaped lamina or coating which, respectively, prevent the adhesive copolymer from adhering to the metallic strip or define a zone of reduced adhesion. Of course, it is also within the spirit and scope of the invention to employ a multitude of generally circular, disc-shaped laminae or coatings which will define a corresponding multitude of zones which allow the adhesive copolymer to be stripped from the metallic strip. In yet another embodiment of the invention, the latent adhesive and fugitive release agent can each be in the form of one or more chevron-shaped strips which will define one or more corresponding zones wherein the adhesive copolymer can be stripped from the metallic strip.

Accordingly, it is an object of this invention to provide an improved cable shielding tape.

Another object of this invention is to provide a cable shielding tape which lends itself to the fabrication of a conductive joint or splice between two lengths of tape or between two lengths of cable.

A further object of this invention is to provide a cable shielding tape having a protective layer which can be peeled from the metallic portion of the tape in certain areas if desired.

These and other objects of the invention will become apparent to one skilled in the art after studying the following detailed description, the appended claims, and the accompanying drawing wherein:

Referring now to the drawing, wherein like reference numerals are used to denote like elements wherever possible, the invention will be described in more detail.

Figure 1:
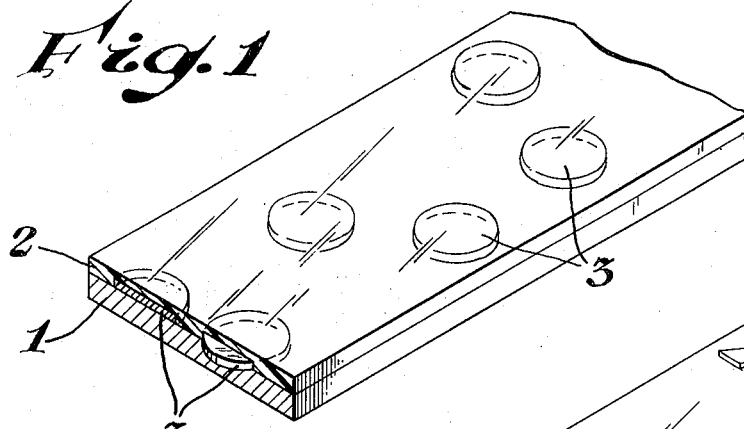
FIG. 1 is a perspective illustration of a portion of a cable shielding tape according to one embodiment of the invention.
Figure 2:
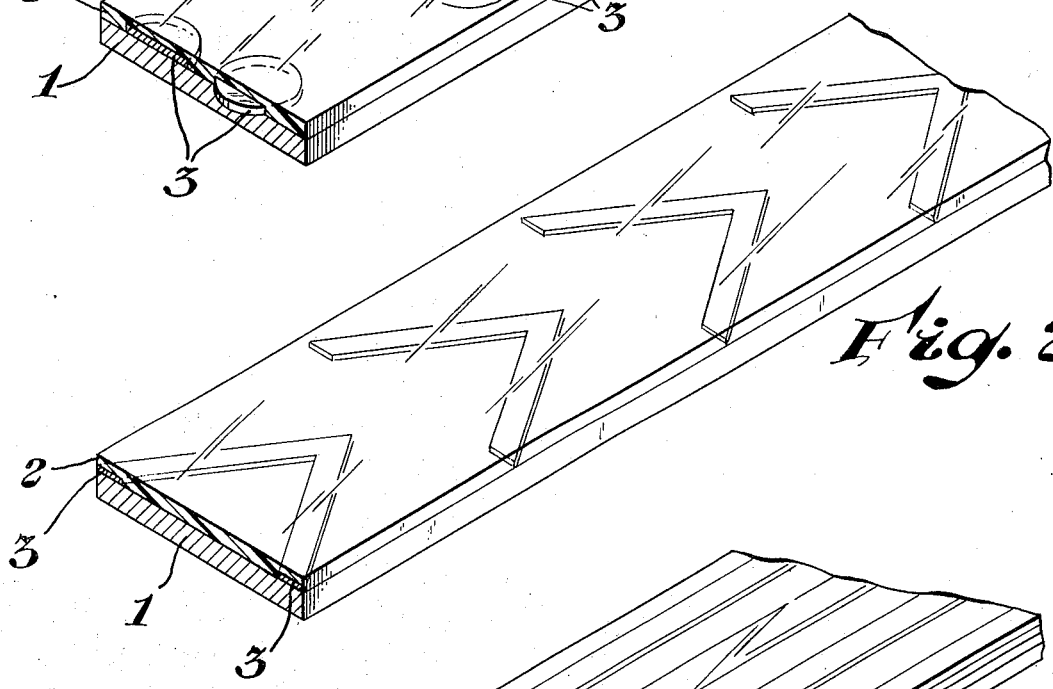
FIG. 2 is a perspective illustration of a portion of another cable shielding tape constructed according to the invention.
Figure 3:
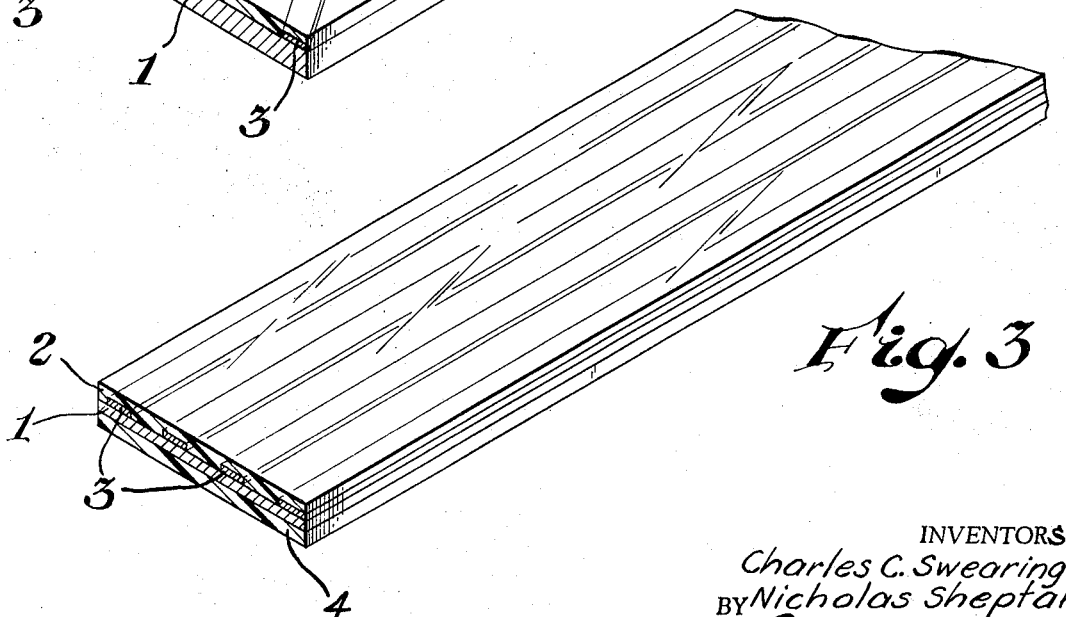
FIG. 3 is a perspective illustration of a section of a cable shielding tape according to another embodiment of the invention.

In FIGS. 1, 2, and 3 of the drawing, a metallic strip 1 is provided with a layer 2 of an adhesive copolymer of an $\alpha$-olefin and an $\alpha,\beta$-ethylenically unsaturated carboxylic acid in mating relationship with the metallic strip 1. The cable shielding tape is provided with zones 3 between the metallic strip 1 and the copolymer layer 2 which allows the copolymer layer 2 to be peeled or stripped from the metallic strip 1 in the zones 3. The zones 3 correspond with the latent adhesive laminae or with the fugitive release agent. While FIGS. 1, 2, and 3 show a plurality of separate zones 3, as previously indicated the latent adhesive and fugitive release agent can exist over the entire area between the metallic strip 1 and the copolymer layer 2 or they can exist as a single lamina or coating in the form of a single strip, disc, chevron pattern, or the like.

In the form shown in FIG. 1 of the drawing, the zones 3 are of generally circular, disc-shaped configuration and they are randomly dispersed on the metallic strip 1 such that the copolymer layer 2 is less tightly adhered to the metallic strip 1 in the area of the zones 3 than is the remainder of the copolymer layer 2 adhered to the metallic strip 1.

In the form shown in FIG. 2 of the drawing, the zones 3 are situated on the metallic strip 1 according to a preselected chevron pattern. It is evident that the zones 3 of reduced adhesion can be situated on the metallic strip 1 according to any preselected pattern desired.

In FIG. 3 of the drawing, a second layer 4 of a copolymer of an $\alpha$-olefin and an $\alpha,\beta$-ethylenically unsaturated carboxylic acid is adhered to the metallic strip 1 on the surface thereof opposite to the surface having the zones 3 of reduced adhesion. In this embodiment of the invention, the zones 3 of reduced adhesion are shown in the form of strips substantially longitudinal of and transversely spaced on the side of the metallic strip 1.

In a modification of the embodiment illustrated by FIG. 3, zones of reduced adhesion can also be formed between the metallic strip 1 and the copolymer layer 4 if desired. Similarly, the cable shielding tapes illustrated in FIGS. 1 and 2 of the drawing can be provided with layers of the copolymer on both sides if desired. In these modifications of the embodiments illustrated by FIGS. 1 and 2, zones of reduced adhesion can be provided between each of the copolymer layers and the metallic strips if desired.

The adhesive copolymer used to fabricate the layer 2 which is in mating relationship with the metallic strip 1 in the cable shielding tape of this invention can be any suitable copolymer of an $\alpha$-olefin having up to and including six carbon atoms per molecule and an $\alpha,\beta$-ethylenically unsaturated carboxylic acid having up to and including eight carbon atoms per molecule.

Exemplary $\alpha$-olefins which can be polymerized with an $\alpha,\beta$-ethylenically unsaturated carboxylic acid to form a copolymer useful in practicing this invention include ethylene, propylene, 1-butene, 1-pentene, methylpropene, 4-methyl-1-pentene, and the like.

Exemplary $\alpha,\beta$-ethylenically unsaturated carboxylic acids which can be copolymerized with the $\alpha$-olefin or which can be grafted onto a polymer of an $\beta$-olefin to produce a graft copolymer useful in practicing this invention include acrylic, methacrylic, ethacrylic, crotonic, isocrotonic, tiglic, angelic, senecioic and the like.

Both random and graft copolymers can be used to fabricate the cable shielding tape of this invention. These copolymers can be obtained commercially or they can be prepared by processes well known in the art. While the invention is not to be bound by any particular technique for preparing the copolymers, an exemplary technique for producing random copolymers involves subjecting a mixture of olefin monomers and acid monomers to a high pressure such as between about 500 and about 1,000 atmospheres and to an elevated temperature such as between about 100° and about 400°C in the presence of a suitable free radical initiator such as lauroyl peroxide, ditertiary butyl peroxide, or $\alpha,\alpha$-azobisisobutyronitrile. Reaction conditions can be varied to produce random copolymers having the desired molecular weight. Exemplary techniques for producing graft copolymers which can be tightly adhered to the metallic strip of the invention are outlined in U.S. Pat. No. 3,177,269 and 3,270,090, the disclosures of which are both specifically incorporated herein by reference.

Although the relative concentrations of the α-olefin and the α,β-ethylenically unsaturated carboxylic acid in the copolymer can vary over wide limits and is largely a matter of personal choice dictated by such factors as, for example, economics, it is generally preferred that the α-olefin be present in the copolymer in an amount between about 75 and about 99.5 percent by weight and the α,β-ethylenically unsaturated carboxylic acid be present in the copolymer in an amount between about 0.5 and about 25 per cent by weight. Partial esters of the α,β-ethylenically unsaturated carboxylic acids can also be used in preparing the copolymers useful in practicing the invention. It is also within the spirit and scope of the invention to employ an adhesive copolymer of an α-olefin and an α,β-ethylenically unsaturated carboxylic acid wherein some of the acid groups are ionized by neutralization with a salt forming cation such as mono-, di-, and trivalent metal ions and the like.

The zones of reduced adhesion between the metallic strip and the copolymer layer can be formed by any suitable technique with any suitable material capable of producing this result. The material which defines the zones of reduced adhesion can be positioned or deposited between the metallic strip and the copolymer layer randomly or it can be deposited according to a preselected pattern.

As previously indicated, one material suitable for defining the zone of reduced adhesion is known as a latent adhesive characterized by having a property known as delayed tack. In this embodiment of the invention, the latent adhesive material is positioned between the metallic strip and the copolymer layer to prevent the copolymer layer from adhering to the metallic strip in certain desired areas. After a predetermined period of time, such as after the copolymer layer has been stripped from the zones of reduced adhesion and the desired electrical connection or the like has been made, the shielding tape can be heated to a temperature with or without pressure to activate the adhesiveness of the latent adhesive material and thereby form a tight bond between the metallic strip and the latent adhesive material. It is generally preferred to employ both heat and pressure to effect a strong bond between the layers. This is a desirable aspect of the invention because the cable shielding tape can be heated to produce a substantially continuous tightly adherent layer after the desired areas of the layer have been stripped from the metallic strip in the zones of reduced adhesion in order to make an electrical connection or the like. Exemplary latent adhesive materials having delayed tack properties which can be used in forming the zones of reduced adhesion in the cable shielding tape of this invention include vinyl polymers such as poly(vinyl acetate), copolymers of vinyl chloride and vinyl acetate, copolymers of vinylidene chloride and vinyl chloride and the like and suitable polyolefins such as polyethylene and the like. These materials can be obtained commercially or they can be produced by any of the suitable polymerization techniques well known in the art. In the embodiment employing copolymers of vinyl chloride and vinyl acetate, the vinyl chloride can be present in an amount up to about 95 percent by weight of the copolymer.

As previously indicated in accordance with another embodiment of the invention, the zones of reduced adhesion between the metallic strip and the adhesive copolymer layer can be formed by employing a material characterized as having fugitive release properties. This type of material produces zones of reduced adhesion between the metallic strip and the copolymer layer for certain periods of time after which the material migrates into or becomes absorbed by the copolymer layer such that it no longer functions to prevent the copolymer layer from tightly adhering to the metallic strip. By proper selection of this type material, the longevity of the zones of reduced adhesion can be programmed so that after a certain predetermined period of time the copolymer layer can be tightly adhered to the metallic strip by the application of heat or heat and pressure. It is generally preferred to employ both heat and pressure to effect a strong bond between the layers.

Exemplary fugitive release agents which become absorbed by the copolymer layer and which can be used in the practice of this invention include natural petroleum oils having a Saybolt viscosity of between about 200 and about 5,000 at 70°F; saturated and unsaturated carboxylic acids having up to about 30 carbon atoms per molecule such as, for example, caproic, lauric, palmitic, stearic, cerotic, pentenic, oleic, erucic, and the like; organic acid esters of an acid selected from the group consisting of phthalic acid, isophthalic acid, and terephthalic acid such as for example, di(octyl)phthalate, di(butyl)phthalate and the like; microcrystalline paraffin waxes; natural and synthetic waxes; and natural and synthetic oils. It is understood that the foregoing materials are exemplary only and that other suitable materials which prevent the copolymer layer from adhering to the metallic strip initially and which will migrate into the copolymer layer with time can be used in the practice of the invention.

Any suitable metal can be used for fashioning the metallic strip employed in the cable shielding tape of this invention such as, for example, aluminum, copper, tin, iron, and the like.

The cable shielding tape of this invention can be of any suitable thickness and width dependent primarily upon the type and size of cable to which it is to be applied. Thus, the metallic strip can have a thickness of between about 0.5 and about 50 mils. The copolymer layer can likewise be of any suitable width and thickness. Thus, the copolymer layer adhered to the metallic strip can have a thickness of between about 0.01 and about 50 or more mils. While the layer on the opposite side of the metallic strip, relative to the side having zones of reduced adhesion, is defined as a second layer in that embodiment of the invention employing a copolymer layer in mating relationship with both sides of the metallic strip, it is evident that the second layer need not be a separate second layer because a single copolymer film could be folded or otherwise laminated around the metallic strip if desired.

The cable shielding tape of this invention can be fabricated by a variety of different techniques such as, for example, extrusion coating, film lamination, electrostatic spraying, solution deposition, and the like.

Similarly, the latent adhesive material or the fugitive release agent employed to define the zones of reduced adhesion can be applied by any suitable technique such as, for example, solution deposition from a gravure roll, extrusion coating, controlled electrostatic painting, offset printing, and the like.

While the relative area of the zones of reduced adhesion can vary over wide limits and is largely a matter of personal choice, the zones wherein the copolymer is less tightly adhered to the metallic strip can represent between about 1 and about 99 percent of the surface area of the metallic strip.

The actual prevention of the adhesion of the adhesive copolymer layer to the metallic strip as a result of the latent adhesive material or the fugitive release agent can be expressed as a percentage of the adhesion in the areas of contact not having either types of material. This percentage value is dependent upon such factors as the type of latent adhesive or fugitive release agent employed, the duration of time elapsed since the latent adhesive or the fugitive release agent was positioned between the metallic strip and the copolymer layer, the temperatures and pressures during application, and the like. By proper selection of the material, the percentage of adhesion between the metallic strip and the copolymer layer in the zones of reduced adhesion can be predicted and controlled. In general, it is preferred that the adhesion of the copolymer layer to the metallic strip in the zones of reduced adhesion be at least about 50 percent less than the adhesion of the remainder of the copolymer layer to the metallic strip.

Although the amount of latent adhesive or fugitive release agent employed will be governed by several factors such as size and thickness of the cable shielding tape, type of metallic strip, type of adhesive copolymer layer, and the like, this material is generally employed in an amount sufficient to provide a layer having a thickness between about one micron and up to about 2 mils. It is understood that this range is for illustration purposes only and that the latent adhesive or fugitive release agent can be used in greater or lesser amounts if desired.

The following example is illustrative of one technique for producing a cable shielding tape according to the teachings of the invention. It is to be understood that this example is for the purpose of illustration only and should not be construed as limiting of the invention,

EXAMPLE

A 1700 foot strip of a laminate comprising a 7.5 mil thick aluminum strip and a 2.3 mil thick ethylene-acrylic acid copolymer layer was printed on the free aluminum surface to provide strips of a latent adhesive material which were substantially longitudinal of and transversely spaced on the aluminum surface. The ethylene-acrylic acid copolymer was of the random variety containing about 8 percent by weight combined acrylic acid and having a melt flow (ASTM 1238–65T, condition E) of about 5 grams per 10 minutes. The copolymer also contained 500 ppm 4,4'-thiobis-2 tertiary butyl-5 methyl phenol antioxidant.

The printed strips were deposited from a gravure roll having an 85 line screen etch so as to provide strips about seven-eights inch wide spaced about seven-eights inch apart over a width of about 36 inches which was approximately centered on the 41-inch wide laminate. The printed strips were deposited from a formulation comprising about 240 parts by weight of a copolymer of 95 percent by weight vinyl chloride and 5 percent by weight vinyl acetate, 32 parts by weight of a slip agent, 16 parts by weight plasticizer, and 1,312 parts by weight of a methyl ethyl ketone solvent. The foregoing mixture also contained a sufficient amount of red paste coloring agent such that the strips could be identified after they had been deposited on the aluminum surface. The material used to form the strips is formulated by The Dow Chemical Company under the designation X–956B Red.

The printing was accomplished by unwinding the strip of laminate and passing it successively through the printing zone and a drying zone to flash the solvent before being wound up on a take up reel. The printing was done at a rate of about 50 feet per minute using maximum tension at both the unwind and the take up reels. The drying zone was maintained at a temperature of about 150°F.

After the strips had been printed on the aluminum surface the laminate was inspected and the strips were found to be very lightly adhered to the aluminum.

The laminate of stripped material was then transferred to an extrusion coating machine wherein an ethylene-acrylic acid copolymer containing about 8 percent combined acrylic acid was extrusion coated onto the aluminum surface having the strips so as to provide a coating about 2.3 mils thick. The coated laminate was post-heated to promote adhesion of the extrusion-coated film to the aluminum surface. The post heat was done at a comparatively low temperature to avoid bonding the vinyl chloride-vinyl acetate copolymer strips. The thus produced cable shielding tape was tested to determine the relative peel strengths of the extrusion-coated copolymer film and the vinyl chloride-vinyl acetate copolymer strips. Table I below reflects the various peel strengths between the metal and the strips and between the metal and the copolymer film in the areas between the strips. Several tests were made wherein there was no post heat, a post heat for 2 seconds at 340°F and 40 psi, and a post heat for 5 seconds at 450°F and 40 psi.

TABLE I

| | Peel Strengths (psi) | | |
|---|---|---|---|
| | No Post Heat | Post heat for 2 sec at 340°F % 40 psi | Post heat for 5 sec at 450°F % 40 psi |
| Vinyl Chloride Vinyl Acetate Strips | 0 | 0.8 | 9 |
| Ethylene-Acrylic Acid Copolymer Films | 3.9 | 12.6 | 11.2 |

It is evident from the data reported above that the ethylene-acrylic acid copolymer film is prevented from adhering to the aluminum strip in the areas having the vinyl chloride-vinyl acetate strips. It is also evident from the data in Table I that the vinyl chloride-vinyl acetate copolymer strips possess latent adhesiveness in that sufficient post heating results in an increase in the adhesion between the strip and the aluminum.

Although the invention has been described in considerable detail, it must be understood that such description is for the purpose of illustration only and is not considered to be limiting of the invention.

What is claimed is:

1. A cable shielding tape comprising a metallic strip, a layer of an adhesive copolymer of an α-olefin and an α,β-ethylenically unsaturated carboxylic acid in mating relationship with at least one surface of said strip, and a layer of a latent adhesive disposed between said metallic strip and said layer of adhesive copolymer which defines at least one zone wherein the adhesive copolymer is prevented from adhering to said metallic strip, the latent adhesive having delayed tack properties such that said layer of latent adhesive is initially lightly adhered to said metallic strip and such that the adhesion of said layer of latent adhesive to said metallic strip can be increased by the application of heat.

2. A cable shielding tape according to claim 1 wherein said layer of the latent adhesive extends over only a portion of the area between said metallic strip and said layer of the adhesive copolymer.

3. A cable shielding tape according to claim 1 wherein said layer of the latent adhesive is in the form of a strip.

4. A cable shielding tape according to claim 1 wherein said layer of the latent adhesive is in the form of a plurality of separate strips transversely spaced and substantially longitudinal of said cable shielding tape thereby providing a plurality of separate zones wherein the adhesive copolymer is prevented from adhering to said metallic strip.

5. A cable shielding tape according to claim 1 wherein said layer of the latent adhesive is in the form of at least one generally circular, disc-shaped lamina.

6. A cable shielding tape according to claim 1 wherein a layer of an adhesive copolymer of an $\alpha$-olefin and an $\alpha,\beta$-ethylenically unsaturated carboxylic acid is adhered to said metallic strip on the surface thereof opposite to the surface in contact with said layer of the latent adhesive.

7. A cable shielding tape according to claim 1 wherein said $\alpha$-olefin is ethylene present in said copolymer in an amount between about 75 and about 99.5 percent by weight, said $\alpha,\beta$-ethylenically unsaturated carboxylic acid is acrylic acid present in said copolymer in an amount between about 0.5 and about 25 percent by weight, and said latent adhesive is selected from the group consisting of vinyl polymers and polyethylene.

* * * * *